United States Patent
Mizina et al.

(10) Patent No.: US 10,304,018 B2
(45) Date of Patent: May 28, 2019

(54) METHOD AND SYSTEM FOR CONTROLLING A DISPLAY SCREEN WITH GRAPHICAL OBJECTS FOR SCHEDULING

(71) Applicant: ORACLE INTERNATIONAL CORPORATION, Redwood Shores, CA (US)

(72) Inventors: Svetlana Mizina, Melbourne (AU); Charles Pieter van't Westeinde, Melbourne (AU); Ludmila Roizman, Melbourne (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 332 days.

(21) Appl. No.: 15/384,964

(22) Filed: Dec. 20, 2016

(65) Prior Publication Data
US 2018/0173380 A1   Jun. 21, 2018

(51) Int. Cl.
*G06Q 10/06* (2012.01)

(52) U.S. Cl.
CPC .................... *G06Q 10/063116* (2013.01)

(58) Field of Classification Search
None
See application file for complete search history.

(56) References Cited

U.S. PATENT DOCUMENTS

| | | | |
|---|---|---|---|
| 8,645,182 B2 | 2/2014 | Johnson et al. | |
| 2002/0143600 A1* | 10/2002 | Dugan | G06Q 10/109 705/7.13 |
| 2005/0228696 A1* | 10/2005 | Egawa | G06Q 10/02 705/2 |
| 2009/0088168 A1* | 4/2009 | Varanasi | H04M 1/663 455/445 |
| 2009/0271716 A1* | 10/2009 | Jones | G06Q 10/109 715/758 |
| 2010/0121665 A1* | 5/2010 | Boyer | G06Q 10/06311 705/7.19 |
| 2013/0268310 A1* | 10/2013 | Wilson | G06Q 10/063116 705/7.16 |
| 2013/0282397 A1* | 10/2013 | Easterhaus | G06Q 50/22 705/3 |

(Continued)

FOREIGN PATENT DOCUMENTS

WO   2015133989 A1   9/2015

*Primary Examiner* — Toan H Vu
(74) *Attorney, Agent, or Firm* — Kraguljac Law Group, LLC

(57) ABSTRACT

Systems, methods, and other embodiments associated with controlling a display screen for scheduling tasks with graphical objects are described. In one embodiment, a method includes in response to receiving a request to modify a scheduling data structure, determining that the request is directed towards scheduling a first task. The example method may also include analyzing the scheduling data structure to identify candidate time slots usable to satisfy the request. The example method may also include controlling a display screen to display graphical objects that correspond to the candidate time slots. The example method may also include in response to receiving user input, via a graphical object, that selects a first time slot from the candidate time slots, generating a set of scheduling instructions.

20 Claims, 8 Drawing Sheets

(56) References Cited

U.S. PATENT DOCUMENTS

| | | | |
|---|---|---|---|
| 2014/0200940 A1* | 7/2014 | Putterman | G06Q 10/1095 |
| | | | 705/7.16 |
| 2016/0191694 A1* | 6/2016 | Kim | H04M 1/72527 |
| | | | 455/418 |
| 2017/0094355 A1* | 3/2017 | McCarty | H04N 21/4667 |
| 2018/0082260 A1* | 3/2018 | Dunn | G06Q 10/1093 |

* cited by examiner

SCHEDULING DATA STRUCTURE — 130

| TASK (310) | TYPE (315) | ASSIGNED TIME SLOT (305) | PRIORITY (320) | DEADLINE (325) |
|---|---|---|---|---|
| TASK (1) | PRODUCT | 11/1/16 4PM-5PM | LOW | 11/26/16 |
| TASK (2) | SERVICE | 11/1/16 6PM-7PM | HIGH | 11/2/16 |
| TASK (3) | MEETING | 11/1/16 8PM-9PM | MEDIUM | N/A |
| TASK (4) | SUPPORT | 11/1/16 10PM-11PM | N/A | 12/30/16 |
| N/A | N/A | 11/2/16 09AM-11AM | N/A | N/A |

METHOD AND SYSTEM FOR CONTROLLING A DISPLAY SCREEN WITH GRAPHICAL OBJECTS FOR SCHEDULING

BACKGROUND

Computing devices are used to implement various graphical services and products. A computing device may provide a graphical user interface (GUI) with which a user may interact. The GUI may display various graphical objects. Such graphical objects may provide information about a service, such as scheduling of tasks, being performed by the computing device. Scheduled tasks may be stored within databases or other storage structures of a distributed network environment (e.g., a cloud service), or within databases or other storage structures of a local computer. A user may interact with the graphical objects to perform operations upon the scheduled tasks. For example, the graphical objects may be used to add new tasks, to remove existing tasks, or to modify existing tasks, and new graphical objects may be created and displayed to represent the changes.

In order to improve use of the GUI, reduce network bandwidth, processing and storage sources, and/or overall system load, it is desirable to efficiently identify and display acceptable time slots for new tasks via graphical objects.

Unfortunately, typical existing GUIs are limited to displaying graphical objects for some time slots, and not for others that could be utilized. Thus, users are limited in their choices.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3 illustrates an embodiment of a scheduling data structure.

DETAILED DESCRIPTION

Computerized systems and methods are described herein that provide for controlling a display screen for scheduling tasks with graphical objects in a computing system. In one embodiment, an electronic schedule is a data structure configured with a number of time slots. The electronic schedule may include different tasks that are scheduled at different time slots. Each task may be assigned a priority. For example, one task may be assigned a low level priority, while another task may be assigned a high level priority.

When a user attempts to schedule a new task, the user may provide input about the new task, such as a deadline by which the new task needs to be completed. The system tries to identify a time slot to which a task is not assigned and presents the time slot for the new task on the display screen. However, if the new task needs to be urgently completed by an upcoming deadline, there may be no time slot vacant in the electronic schedule prior to the deadline of the new task. Thus, in order to complete the new task prior to the deadline, an existing task may need to be moved in the electronic schedule.

In one embodiment, existing tasks in the schedule may initially be filtered based on preliminary criteria, such as being scheduled in time slots prior to the deadline, and having a low priority. The remaining existing tasks may then be more closely examined to determine which of the remaining existing tasks can be moved to a (different) available time slot without violating their deadline. In one embodiment, the present system displays, as graphical objects, the existing tasks that are determined to meet both the preliminary criteria, and be movable to alternative available time slots. In response to receiving an input selecting one of the existing tasks, the system may reassign the selected task from its original time slot to an alternative time slot, and the new task may be assigned to the original (previously unavailable) time slot of the selected task.

A need for such a system may arise in situations where graphical objects are provided for scheduling tasks. For example, a medical office may schedule appointments that doctors have with their patients and meetings that doctors have with their vendors, while an internet service provider (ISP) may schedule appointments that technicians may have with new customers. There are a limited number of time slots available to schedule tasks in a given schedule. When possible, a time slot of the schedule that does not have an existing task assigned to it may be used for a new task. However, many times, a new task may need to be scheduled with short notice, and the schedule may be filled. Unfortunately, a typical schedule may involve a large number of tasks, which may often be difficult to sift through, assess and modify. Accordingly, users cannot easily move existing tasks to different time slots to make a time slot available for a new task.

Figure 1:
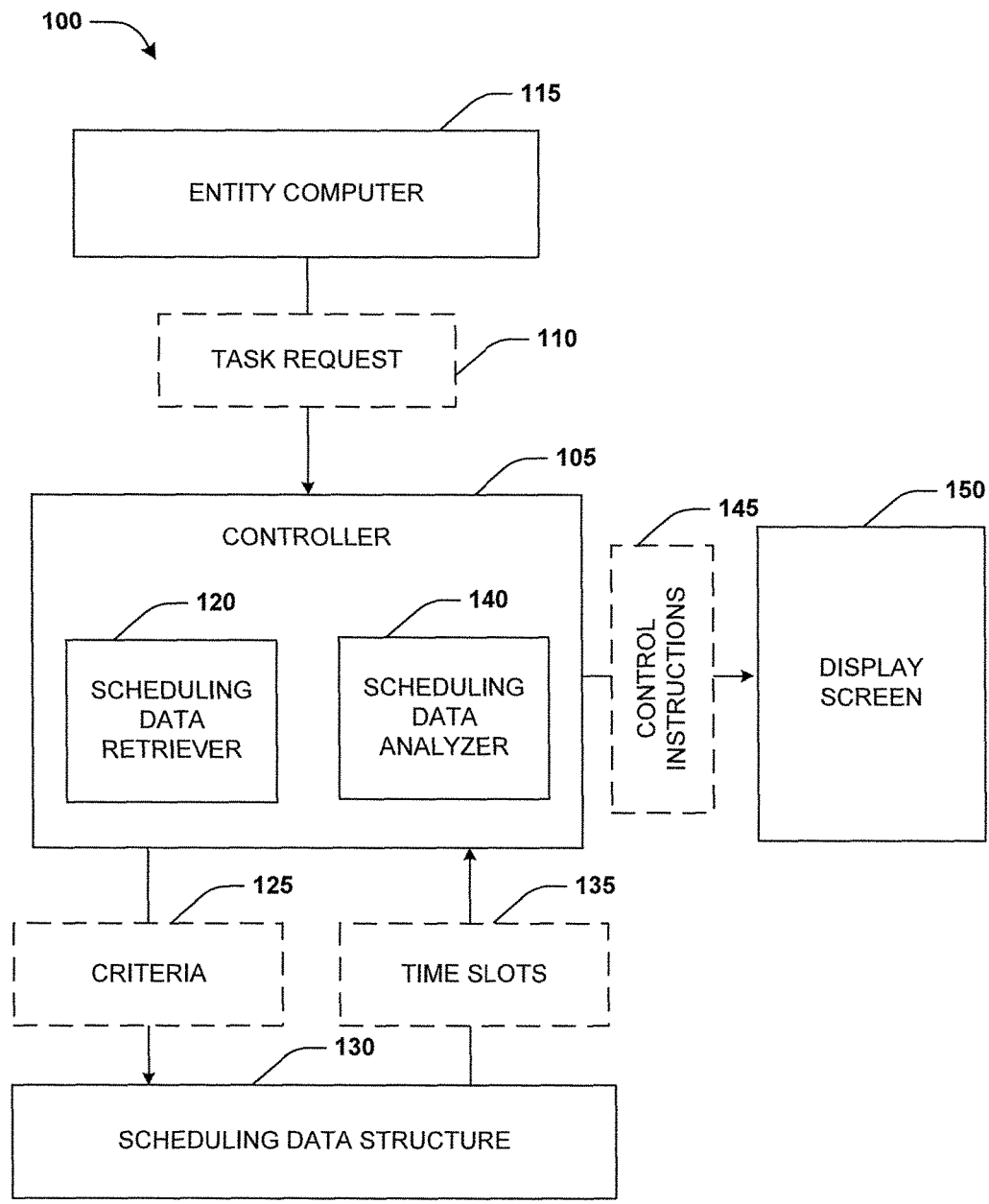
FIG. 1 illustrates an embodiment of a system associated with controlling a display screen with graphical objects in a computing system.

With reference to FIG. 1, one embodiment of a system 100 associated with controlling a display screen for scheduling tasks with graphical objects is illustrated. The system 100 includes a controller 105, which may be configured to execute on a computer. The controller 105 may be initiated based upon a task request 110 being received from an entity computer 115, such as a computer of the ISP that is requesting a task to be scheduled. For example, the task may be an appointment to set up an internet connection at an office of a corporate customer. The controller 105 may receive the task request 110 over a network connection. A scheduling data retriever 120 is configured to analyze the task request 110 and identify data within that identifies a task and associated parameters.

The controller 105 utilizes the scheduling data retriever 120 to generate criteria 125 for time slots to be considered for the task request 110. The criteria 125 may specify a time frame within which the task needs to be scheduled. For example, the time frame may be determined based upon the task request 110, and may specify a starting point in time on or after which the task may be scheduled and an ending point in time on or prior to which the task may be scheduled. Alternatively, the time frame may specify the ending point in time on or prior to which the task may be scheduled without specifying the starting point in time. For example, the criteria 125 may specify "within 3 days" as the time frame, in accordance with a need of the corporate customer to have the Internet connection operational within 3 days.

The criteria 125 may further specify a threshold priority (level). The criteria 125 may further specify a medium priority as the threshold priority. For example, the task may have a medium priority, and the ISP may not want to modify tasks with similar or higher priority, and may instead only want to consider modifying tasks with a lower priority. In another example, a value of the corporate customer to the ISP may be a medium value, and the ISP may not want to modify tasks associated with customers that are of similar or higher value to the ISP, and may instead only want to consider modifying tasks associated with customers that are of lower value to the ISP.

In another example, the priority of the (new) task may be indicative of a level of (e.g., processor, memory, etc.) resources that are to be allocated to identify time slots for the task. For example, the higher the priority of the task, the greater the number of time slots of the scheduling data structure 130 that are to be considered when scheduling the task, and thus the more resources are allocated to identify time slots for the task when scheduling the task.

The criteria 125 is used to analyze the scheduling data structure 130 in order to identify time slots 135. For example, the time slots 135 may include time slots in the scheduling data structure that fall within the time frame, and that are assigned to tasks that have priorities lower than the threshold priority. For example, time slots that exist within 3 days of a current time, and that are assigned to tasks with a priority lower than a medium priority may be identified in the scheduling data structure 130 for inclusion in the time slots 135.

The controller 105 utilizes the scheduling data analyzer 140 to analyze the time slots 135 for the identification of time slots that can satisfy the task request 110. The time slots 135 may each be considered to identify time slots that are assigned to a task for which an alternative time slot is available. For example, a first time slot of the time slots 135 may be assigned to a second task. The second task may be to perform a routine checkup on a server. A determination may be made that the second task may be rescheduled to an alternative time slot, which is determined to be available, while still meeting criteria of the second task. The criteria of the second task may include a deadline before which the second task needs to be scheduled. In the example, a second time slot of the time slots 135 may be assigned to a third task. The third task may be to install a critical software update. A determination may be made that the third task may not be rescheduled as no alternative time slots that would meet the criteria of the third task are found. Thus, the first time slot is identified as being able to satisfy the task request 110, while the second time slot is not identified as being able to satisfy the task request 110.

It may be appreciated that tasks with higher priorities may be associated with a greater probability of not being movable to an alternative time slot than tasks with lower priorities. That is, in an example, even though it may be likely that a task with a priority higher than the threshold priority is movable to an alternative time slot, it is more likely that another task with a priority lower than the threshold priority is movable to an alternative time slot. Thus, it is more efficient to consider the other task first. Using this heuristic approach, an appropriate time slot may be identified using less processing power, less memory usage, less database accessing, etc.

The controller 105 generates control instructions 145 to provide to, and thus control, the display screen 150. The control instructions 145 may provide for the display screen 150 to display graphical objects corresponding to time slots that are able to satisfy the task request 110. For example, the control instructions 145 may provide for the display screen 150 to display a first graphical object corresponding to the first time slot, but may not provide for the display screen 150 to display a second graphical object corresponding to the second time slot.

It may be appreciated that user input selecting the first graphical object in the display screen may be received. Scheduling instructions may be generated based upon the user input selecting the first graphical object. The scheduling instructions may include a first instruction to unassign the first time slot from the second task, a second instruction to assign the alternative time slot to the second task, and a third instruction to assign the first time slot to the first task. The scheduling instructions may be used to modify and regenerate the scheduling data structure 130 in accordance with the first instruction, the second instruction and the third instruction.

In a variation of this embodiment, the first instruction and the second instruction are generated and used to modify and regenerate the scheduling data structure 130 in response to the first time slot being identified as being able to satisfy the task request 110, and prior to the user input selecting the first graphical object in the display screen is received. In this variation, the scheduling instructions generated based upon the user input selecting the first graphical object include the third instruction, but not the first instruction and the second instruction.

Figure 2:
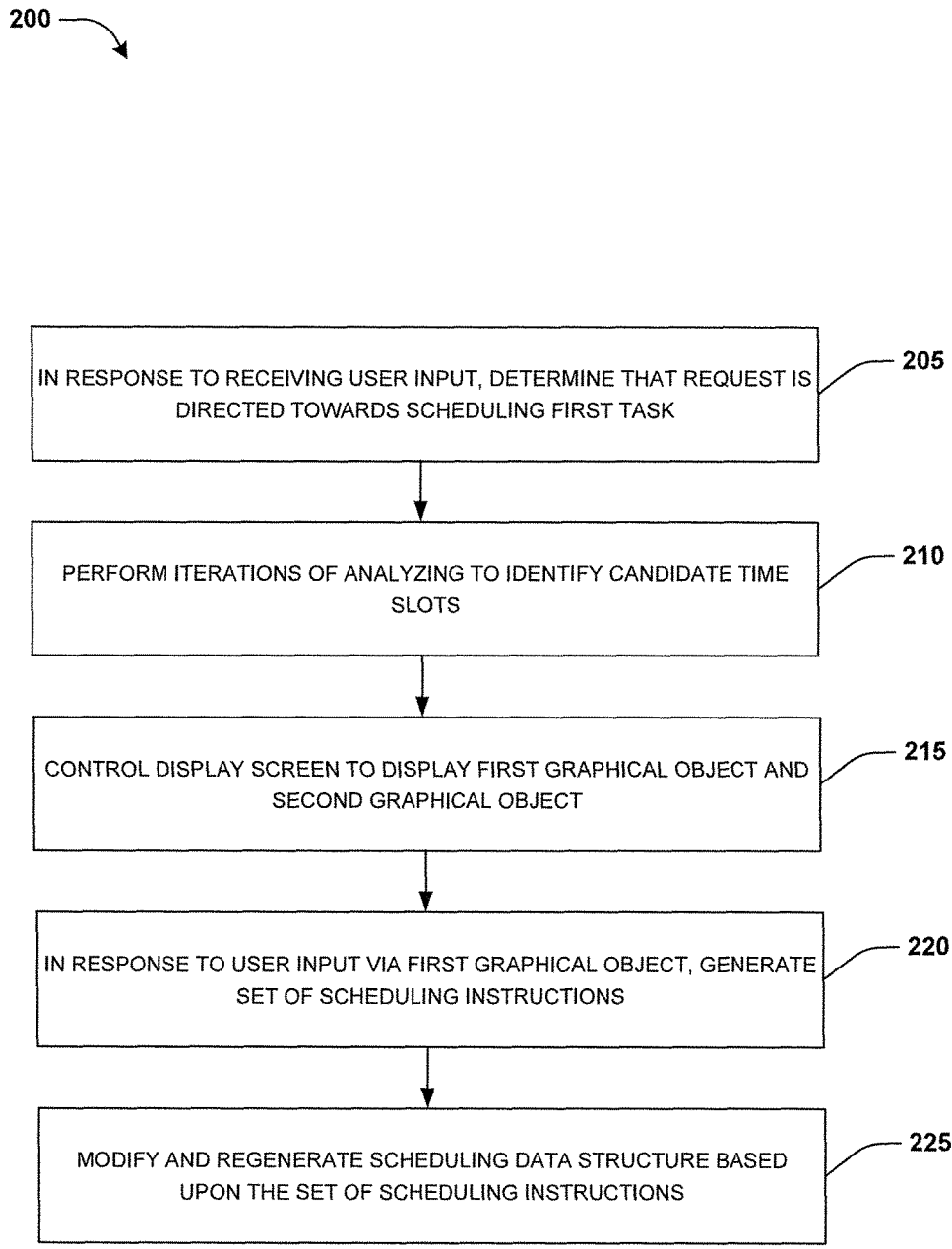
FIG. 2 illustrates an embodiment of a method associated with controlling a display screen with graphical objects in a computing system.

FIG. 2 illustrates one embodiment of a computer-implemented method 200 associated with controlling a display screen for scheduling tasks with graphical objects. The method 200 may be performed by the controller 105 utilizing various computing resources of the computer 805 (shown in FIG. 8), such as the processor 810 for executing instructions, memory 815 and/or disks 830 for storing data structures within which control instructions are generated, and/or network hardware for transmitting data structures to remote computers over networks. The method 200 may be triggered based upon various triggers, such as receipt of the task request 110 from the entity computer 115, etc.

Figure 4:
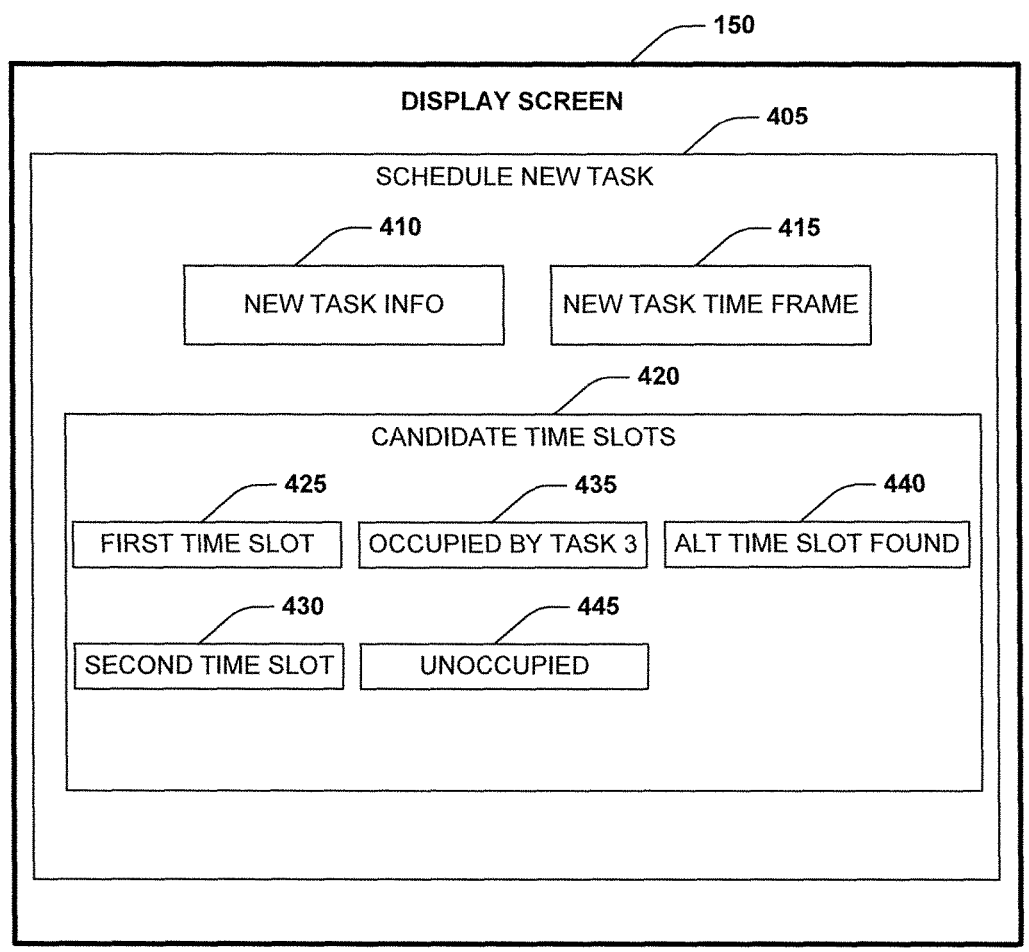
FIG. 4 illustrates an embodiment of a display screen and a graphical user interface.

One embodiment of generation of the task request 110 is shown in FIG. 4. A new task GUI 405 is configured to receive input for scheduling a first (new) task. The first task may be an electrical contracting job to be performed by an electrical contractor selected from a plurality of electrical contractors. The new task GUI 405 includes an information field 410 and a time frame field 415. The information field 410 may be utilized to receive input specifying details of the new task. For example, a description of the electrical contracting job, an identifier of the electrical contractor (or an identifier of a capability associated with electrical contractors) and a priority label may be received via the information field 410.

The time frame field 415 may be utilized to receive input specifying a time frame associated with the first task. For example, a first date, Nov. 11, 2016 and a second date, Nov.

16, 2016, between which the electrical contracting job is to be scheduled, may be received via the time frame field 415.

With reference again to FIG. 2, at 205, in response to receiving the task request 110 to modify the scheduling data structure 130, a determination is made that the task request 110 is directed towards scheduling the first task. The determination further includes determining that the first task is assigned a first priority, and that the first task is requested to be scheduled within the time frame. For example, information received via the information field 410 and the time frame field 415 (shown in FIG. 4) is analyzed in response to receiving a selection of a request to submit the information in each field, and may be used to determine that the first task is assigned the first priority, a high priority, and to determine the time frame, between Nov. 11, 2016 and Nov. 16, 2016.

At 210, the scheduling data structure 130 is iteratively analyzed to identify candidate time slots, within the time frame, that are usable to satisfy the task request 110. A first iteration of analyzing the scheduling data structure 130 may be performed to identify one or more time slots that are within the time frame and that are assigned to one or more tasks assigned a second priority lower than a threshold priority. The threshold priority may be specified in the task request 110, or may be defined as part of a default setting. For example, a first time slot that is on Nov. 15, 2016 and is assigned to a second task with a low priority, along with another time slot that is on Nov. 16, 2016 and is assigned to another task with a medium priority, may be identified in the first iteration. The second task may be a meeting with a prospective vendor. Another time slot that is within the time frame but is assigned to another task that is assigned a priority equal to or higher than the threshold priority may not be identified in the first iteration.

In some examples, a priority of a task may be predicted and assigned automatically to the task based upon an analysis of details of the task. For example, if details of the task indicate that the task is associated with a recent event of importance at a company or in the news, the task may be determined to have a high priority. If instead, details of the task indicate that the task is associated with a low value for company, the task may be determined to have a low priority.

A second iteration of analyzing the one or more time slots identified in the scheduling data structure 130 may be performed to identify time slots that are assigned to tasks for which an alternative time slot is available. For example, the first time slot may be determined to be assigned to the second task, which may be determined to have an alternative time slot on Nov. 18, 2016. The alternative time slot may be determined to be acceptable for the second task based upon criteria associated with the second task. The criteria of the second task may include a deadline by which the second task is to be completed. The first time slot may be included in the candidate time slots based upon the determination of the alternative time slot.

In another example, a third time slot of the one or more time slots may be determined to be assigned to a third task. A determination may be made that no alternative time slot is available for the third task. No alternative time slot may be determined to be acceptable for the third task based upon criteria associated with the third task. The criteria of the third task may include a deadline by which the third task is to be completed. For example, the deadline of the third task may be Nov. 15, 2016, or another date close to the first time slot. The third time slot may be excluded from the candidate time slots based upon the determination that no alternative time slot is available for the third task.

In one embodiment, the scheduling data structure 130 includes a plurality of time slots 305 and a plurality of tasks 310 assigned to one or more of the plurality of time slots 305, as illustrated in FIG. 3. The scheduling data structure 130 further includes a plurality of types 315, a plurality of priority labels 320, and a plurality of deadlines 325. For example, each time slot may be assigned a corresponding task, and may further be associated with a type of the task, a priority of the task, and a deadline for the task. It may be appreciated that some time slots, such as the time slot corresponding to task (3), may not be associated with a deadline, while some time slots, such as the time slot corresponding to task (4), may not be assigned a priority. In the example, the candidate time slots are identified by analyzing the scheduling data structure 130 to determine the plurality of time slots 305 and determine which of the plurality of time slots 305 are assigned to a task and which are not assigned to a task.

In one embodiment, the scheduling data structure 130 includes a first data substructure associated with a first user, a second data substructure associated with a second user and a third data substructure associated with a third user. In the example, the first user is a first electrical contractor and the first data substructure stores a plurality of time slots, corresponding to a schedule of the first electrical contractor, and a plurality of tasks, corresponding to jobs of the first electrical contractor, assigned to one or more of the plurality of time slots. The second user is a second electrical contractor and the second data substructure stores a plurality of time slots, corresponding to a schedule of the second electrical contractor, and a plurality of tasks, corresponding to jobs of the second electrical contractor, assigned to one or more of the plurality of time slots. The third user is a computer technician and the third data substructure stores a plurality of time slots, corresponding to a schedule of the computer technician, and a plurality of tasks, corresponding to jobs of the computer technician, assigned to one or more of the plurality of time slots.

In the example, the task request 110 is determined to be directed towards the first user. For example, an identifier of the first user may be detected in the task request 110. In response, analyzing the scheduling data structure 130 may initially start by analyzing the first data substructure due to its association with the first user, rather than other data substructures of the scheduling data structure 130 associated with other users. A determination is made that the plurality of time slots of the first data substructure are not usable to satisfy the request. For example, a determination may be made that all of the relevant time slots of the schedule of the first electrical contractor, which are applicable to the task request 110, are assigned to jobs for the first electrical contractor, and alternative time slots are not available for the jobs.

In response to determining that the plurality of time slots of the first data substructure are not usable to satisfy the request, a determination is made that the second user is associated with a same capability as the first user. For example, a determination is made that the second electrical contractor is capable of doing the same jobs as the first electrical contractor due to their common educational or technical experiences. The second data substructure associated with the second user is thus analyzed to identify candidate time slots usable to satisfy the task request 110. For example, the schedule of the second electrical contractor may be searched to find a time slot during which the second electrical contractor can satisfy the task request 110.

In response to determining that the plurality of time slots of the first data substructure are not usable to satisfy the request, a determination is made that the third user is not associated with the same capability as the first user. For example, a determination is made that the computer technician is not capable of doing the same jobs as the first electrical contractor due to their different educational or technical experiences. The third data substructure associated with the third user is thus not analyzed to identify candidate time slots usable to satisfy the task request 110. For example, the schedule of the computer technician may not be searched to find a time slot during which the computer technician can satisfy the task request 110.

In a variation of this embodiment, instead of the first user, a first resource is associated with the capability and with the first data substructure, instead of the second user, a second resource is associated with the same capability and with the second data substructure, and instead of the third user, a third resource is not associated with the same capability as the first resource but is associated with the third data substructure. In an example, the first resource is a first vehicle that is capable of delivering packages, the second resource is a second vehicle that is capable of delivering the packages, and the third resource is a motorcycle that is not capable of delivering the packages. In another example, the first resource is a first conference room that is capable of hosting a meeting, the second resource is a second conference room that is capable of hosting the meeting, and the third resource is a closet that is not capable of hosting the meeting.

In one embodiment, the candidate time slots may include one or more time slots that are determined to be assigned to optional tasks. A task may be determined to be optional based upon a label assigned to the task, or based upon analysis of details of the task. For example, if details of the task indicate that the task is of significance to the goals or mission statement of a company, as repairing a nearby electrical cable may be to an electrical contracting company, the task may not be determined to be optional. If instead, the details of the task indicate that the task is incidental to the goals or mission statement of the company, as vacuuming a lobby may be to the electrical contracting company, the task may be determined to be optional.

At 215 and with reference to FIG. 4, the display screen 150 is controlled to display a first graphical object 425 that corresponds to the first time slot and a second graphical object 430 that corresponds to a second time slot, as part of a candidate time slot GUI 420. The first graphical object 425 and the second graphical object 430 are selectable to satisfy the task request 110. The candidate time slot GUI 420 may further include a graphical object 435 indicative of a task to which the first time slot is assigned, a graphical object 440 indicative of the alternative time slot identified for the second task, and a graphical object 445 indicating that the second time slot is assigned to no task.

Figure 5:
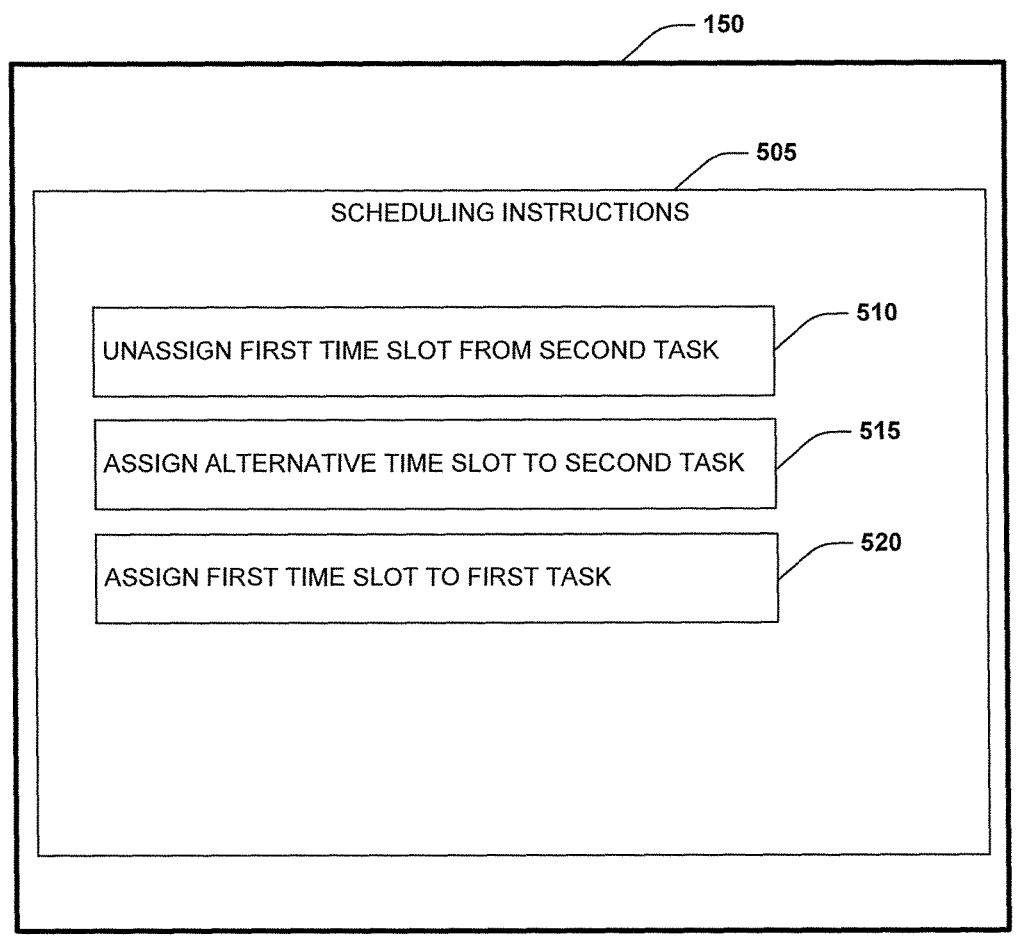
FIG. 5 illustrates an embodiment of the display screen with scheduling instructions.

At 220, in response to receiving user input that selects the first time slot via the first graphical object 425, a graphical object of scheduling instructions is generated and displayed on the display screen 150. One embodiment is shown in FIG. 5 as a set of scheduling instructions 505 displayed in a graphical window on the display screen 150. The set of scheduling instructions 505 includes a first instruction 510 to unassign the first time slot from the second task, a second instruction 515 to assign the alternative time slot to the second task, and a third instruction 520 to assign the first time slot to the first task.

With reference again to FIG. 2, at 225, the scheduling data structure 130 is modified and regenerated based upon the set of scheduling instructions 505. The alternative time slot is assigned to the second task and the first time slot is assigned to the first task. For example, Nov. 18, 2016 may be assigned to the meeting with the prospective vendor, and Nov. 15, 2016 may be assigned to the electrical contracting job.

In this manner, even though the time slots within the time frame required for the electrical contracting job could have all been assigned to one or more tasks or otherwise unavailable, the electrical contracting job is scheduled within the time frame. At the same time, the meeting with the prospective vendor is not sacrificed, and is instead rescheduled to a time slot that is considered acceptable in view of requirements of the meeting. By performing iterations of analyzing the scheduling data structure 130, candidate time slots such as the time slot of the meeting with the prospective vendor are efficiently identified without having to sequentially analyze all entries of the scheduling data structure 130 to determine whether each and every time slot is assigned to a task for which an alternative time slot is available. In this manner, an appropriate time slot is identified for the electrical contracting job using less processing power, less memory usage, less database accessing, etc.

Figure 6:
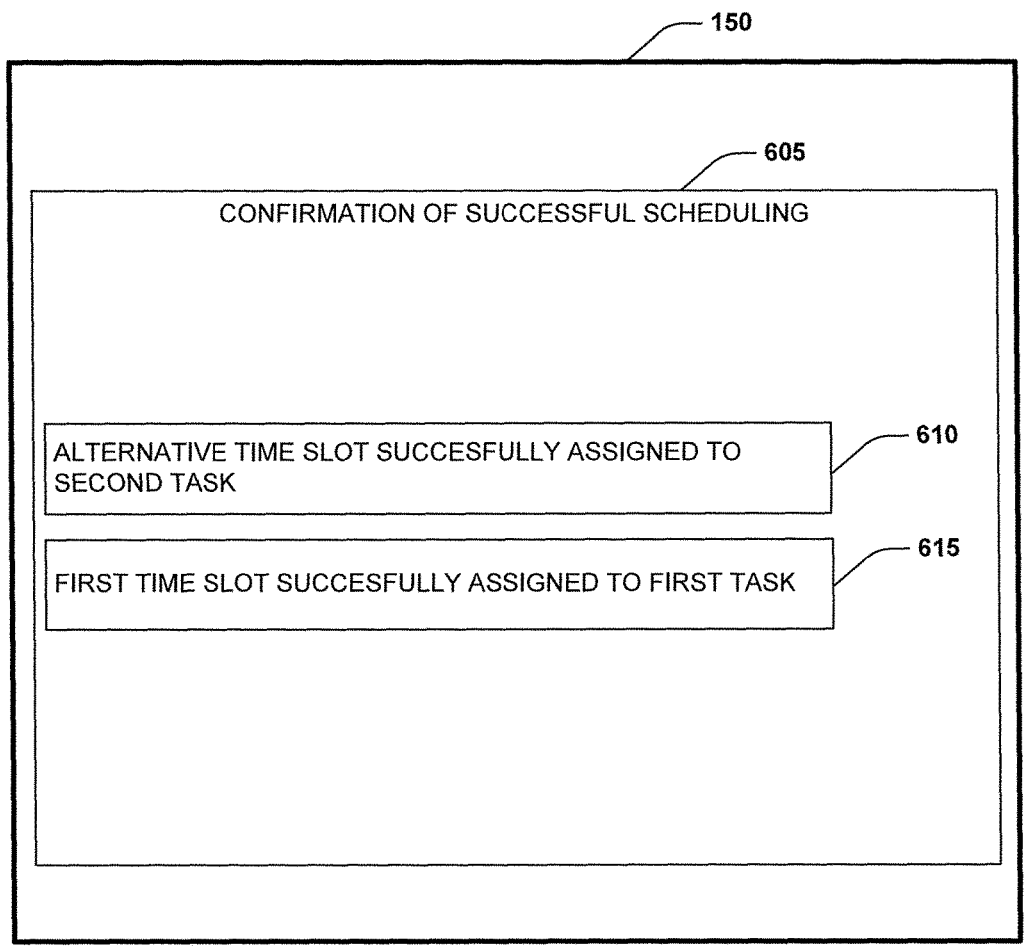
FIG. 6 illustrates an embodiment of the display screen with confirmation of successful scheduling.

In an embodiment of a confirmation of successful scheduling 605 shown in FIG. 6, the display screen 150 is controlled to display a third graphical object 610 that indicates the assignment of the alternative time slot to the second task, and a fourth graphical object 615 that indicates the assignment of the first time slot to the first task. The third graphical object 610 is generated and displayed in response to an analysis of the scheduling data structure 130 verifying that the alternative time slot is assigned to the second task. The fourth graphical object 615 is generated and displayed in response to an analysis of the scheduling data structure 130 verifying that the first time slot is assigned to the first task.

In one embodiment, one or more of the techniques or functions described herein may be implemented using heuristic functions to improve speed and/or efficiency. In an example, if a first new task and a second new task are being scheduled within a threshold period of time of one another (e.g., within 5 minutes), and the first new task is scheduled for a first day, time slots in the first day may not be analyzed to identify a candidate time slot for the second new task; even though the first day may be likely to have a candidate time slot, it is more likely that a second day (other than the first day) has a candidate time slot. Thus, it is more efficient to consider the second day first. In this manner, an appropriate time slot may be identified using less processing power, less memory usage, less database accessing, etc.

In an example, a task to which a time slot is assigned, prior to being moved to a different time slot, may be considered in view of additional factors that may not be stored in association with the task in the scheduling data structure 130. For example, a travel time associated with the task may be estimated and taken into account when determining whether the different time slot is an acceptable alternative time slot for the task.

Figure 7:
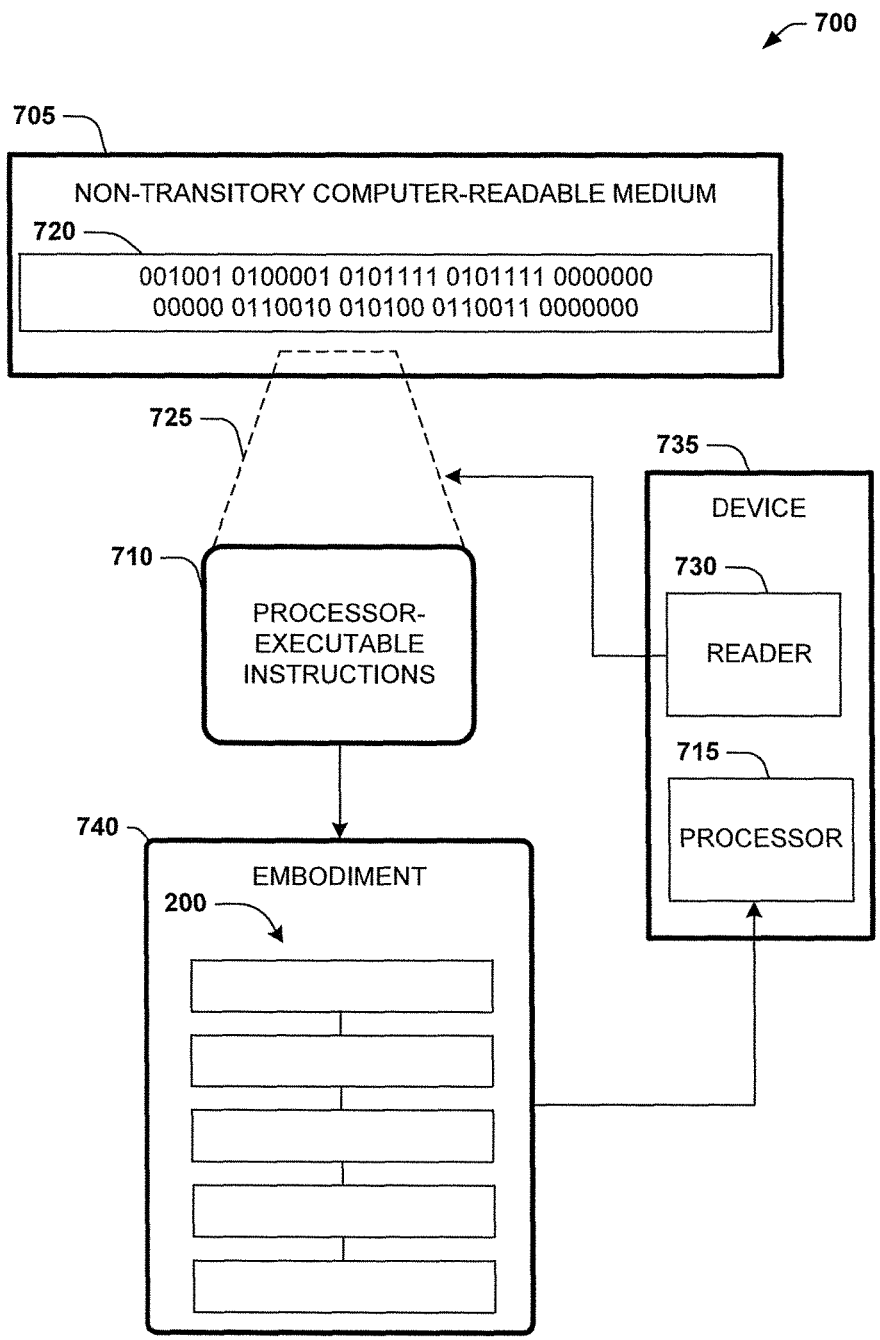
FIG. 7 illustrates an embodiment of a non-transitory computer-readable medium.

FIG. 7 is an illustration of a scenario 700 involving an example non-transitory computer-readable medium 705. In one embodiment, one or more of the components described herein are configured as program modules, such as the controller 105, stored in the non-transitory computer-readable medium 705. The program modules are configured with stored instructions, such as processor-executable instructions 710, that when executed by at least a processor, such as processor 715, cause the computing device to perform the corresponding function(s) as described herein. For example, functionality of the controller 105, stored in the non-transitory computer-readable medium 705, may be executed by the processor 715 as the processor-executable instructions 710 to perform an embodiment 740 of the method 200 of FIG. 2.

The non-transitory machine readable medium 705 includes the processor-executable instructions 710 that when executed by a processor 715 cause performance of at least some of the provisions herein. The non-transitory machine readable medium 705 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 705 stores computer-readable data 720 that, when subjected to reading 725 by a reader 730 of a device 735 (e.g., a read head of a hard disk drive, or a read operation invoked on a solid-state storage device), express the processor-executable instructions 710. In some embodiments, the processor-executable instructions 710, when executed cause performance of operations, such as at least some of the example method 200 of FIG. 2, for example. In some embodiments, the processor-executable instructions 710 are configured to cause implementation of a system, such as at least some of the example system 100 of FIG. 1, for example.

Figure 8:
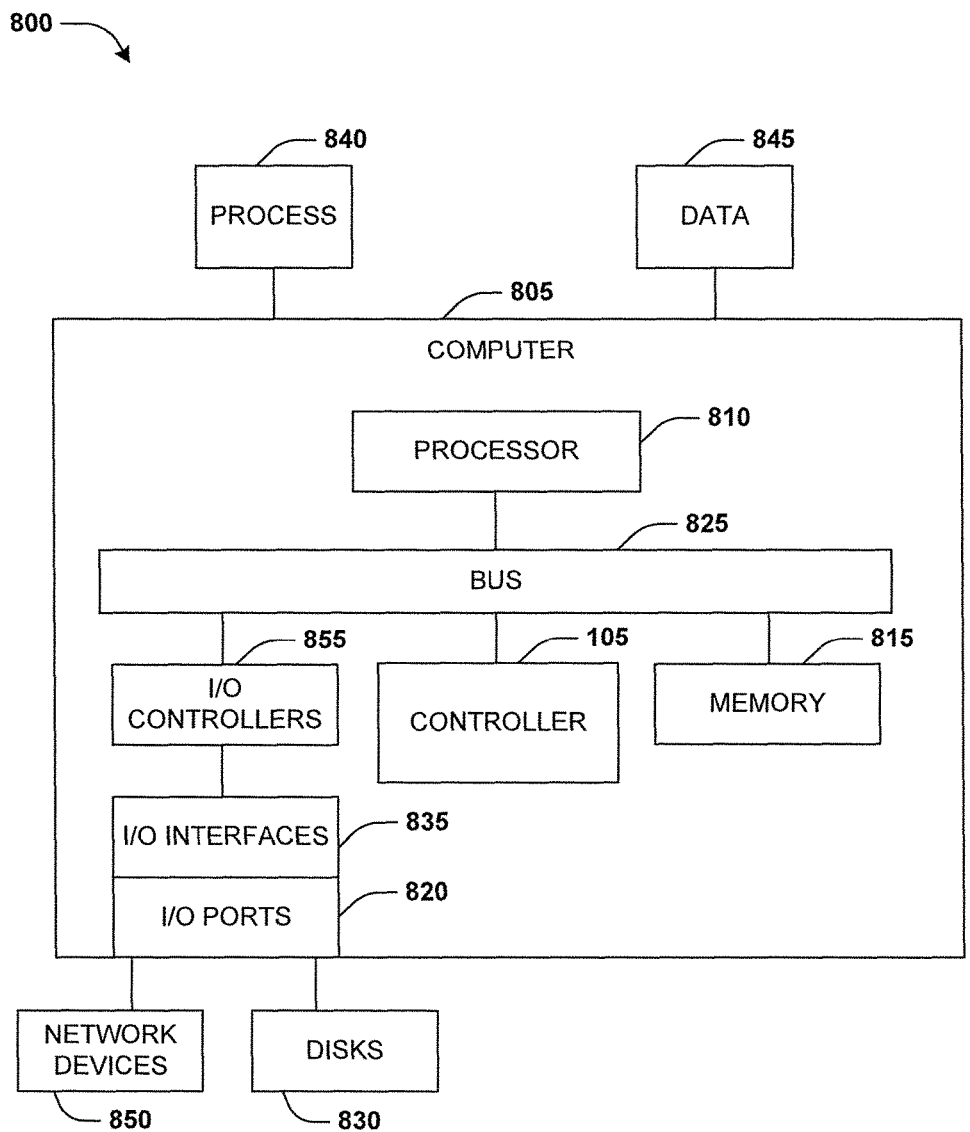
FIG. 8 illustrates an embodiment of a computing system configured with the example systems and/or methods disclosed.

FIG. 8 illustrates a scenario 800 of an example computing device that is configured and/or programmed with one or more of the example systems and methods described herein, and/or equivalents. The example computing device may be a computer 805 that includes a processor 810, a memory 815, and input/output ports 820 operably connected by a bus 825. In one example, the computer 805 may include logic of the controller 105 configured to facilitate the system 100 and/or the method 200 shown in FIGS. 1 and 2. In different examples, the logic of the controller 105 may be implemented in hardware, a non-transitory computer-readable medium 705 with stored instructions, firmware, and/or combinations thereof. While the logic of the controller 105 is illustrated as a hardware component attached to the bus 825, it is to be appreciated that in other embodiments, the logic of the controller 105 could be implemented in the processor 810, stored in memory 815, or stored in disk 830.

In one embodiment, logic of the controller 105 or the computer 805 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 805 as data 845 that are temporarily stored in memory 815 and then executed by processor 810.

The logic of the controller 105 may also provide means (e.g., hardware, non-transitory computer-readable medium 705 that stores executable instructions, firmware) for performing rule based source sequencing for allocation.

Generally describing an example configuration of the computer 805, the processor 810 may be a variety of various processors including dual microprocessor and other multiprocessor architectures. The memory 815 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 830 may be operably connected to the computer 805 via, for example, an input/output (I/O) interface (e.g., card, device) 835 and an input/output port 820. The disks 830 may be, for example, a magnetic disk drive, a solid state disk drive, a floppy disk drive, a tape drive, a Zip drive, a flash memory card, a memory stick, and so on. Furthermore, the disks 830 may be a CD-ROM drive, a CD-R drive, a CD-RW drive, a DVD ROM, and so on. The memory 815 can store a process 840 and/or a data 845, for example. The disk 830 and/or the memory 815 can store an operating system that controls and allocates resources of the computer 805.

The computer 805 may interact with input/output (I/O) devices via the I/O interfaces 835 and the input/output ports 820. Input/output devices may be, for example, a keyboard, a microphone, a pointing and selection device, cameras, video cards, displays, the disks 830, the network devices 850, and so on. The input/output ports 820 may include, for example, serial ports, parallel ports, and USB ports. I/O controllers 855 may connect the I/O interfaces 835 to the bus 825.

The computer 805 can operate in a network environment and thus may be connected to the network devices 850 via the I/O interfaces 835, and/or the I/O ports 820. Through the network devices 850, the computer 805 may interact with a network. Through the network, the computer 805 may be logically connected to remote computers. Networks with which the computer 805 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer cause the computer to perform operations comprising:
   in response to receiving a request to modify a scheduling
      data structure that includes a plurality of time slots, determining that the request is directed towards scheduling a first task assigned a first priority within a time frame;
performing iterations of analyzing the scheduling data structure to identify candidate time slots, within the time frame, usable to satisfy the request, comprising:
  performing a first iteration of analyzing the scheduling data structure to identify one or more time slots based upon a determination that the one or more time slots are within the time frame and are assigned to one or more tasks assigned a second priority lower than a threshold priority; and
  performing a second iteration of analyzing the one or more time slots to identify a first time slot based upon a determination that the first time slot is assigned to a second task for which an alternative time slot is available;
controlling a display screen to display a first graphical object that corresponds to the first time slot and a second graphical object that corresponds to a second time slot, wherein the first graphical object and the second graphical object are selectable to satisfy the request;
in response to receiving user input, via the first graphical object, that selects the first time slot from the candidate time slots, generating a set of scheduling instructions (i) unassigning the first time slot from the second task, (ii) assigning the alternative time slot to the second task and (iii) assigning the first time slot to the first task; and
modifying and regenerating the scheduling data structure, based upon the set of scheduling instructions, to assign the alternative time slot to the second task and the first time slot to the first task.

2. The non-transitory computer-readable medium of claim 1, wherein the scheduling data structure includes a plurality of tasks assigned to one or more of the plurality of time slots, wherein the candidate time slots are identified by analyzing the scheduling data structure to determine the plurality of time slots and determine which of the plurality of time slots are assigned to a task and which are not assigned to a task.

3. The non-transitory computer-readable medium of claim 1, wherein the operations further comprise:
  identifying the first time slot and a third time slot of the one or more time slots;
  determining that the first time slot is assigned to the second task and the third time slot is assigned to a third task;
  in response to determining that the alternative time slot is available for the second task, including the first time slot in the candidate time slots; and
  in response to determining that no alternative time slot is available for the third task, excluding the third time slot from the candidate time slots.

4. The non-transitory computer-readable medium of claim 1, wherein the scheduling data structure further comprises:
  a first data substructure, associated with a first user, comprising a plurality of time slots and a plurality of tasks assigned to one or more of the plurality of time slots;
  a second data substructure, associated with a second user, comprising a plurality of time slots and a plurality of tasks assigned to one or more of the plurality of time slots; and
  a third data substructure, associated with a third user, comprising a plurality of time slots and a plurality of tasks assigned to one or more of the plurality of time slots.

5. The non-transitory computer-readable medium of claim 4, wherein the operations further comprise determining that the request is directed towards the first user, wherein the analyzing the scheduling data structure to identify candidate time slots usable to satisfy the request further comprises:
  analyzing the first data substructure; and
  in response to determining that one or more of the plurality of time slots of the first data substructure are not usable to satisfy the request:
    determining that the second user is associated with a same capability as the first user; and
    analyzing the second data substructure to identify candidate time slots usable to satisfy the request.

6. The non-transitory computer-readable medium of claim 4, wherein the operations further comprise determining that the request is directed towards the first user, wherein the analyzing the scheduling data structure to identify candidate time slots usable to satisfy the request further comprises:
  analyzing the first data substructure; and
  in response to determining that one or more of the plurality of time slots of the first data substructure are not usable to satisfy the request:
    determining that the third user is not associated with a same capability as the first user; and
    not analyzing the third data substructure to identify candidate time slots usable to satisfy the request.

7. The non-transitory computer-readable medium of claim 1, wherein the operations further comprise:
  generating a third graphical object that indicates the assignment of the alternative time slot to the second task;
  generating a fourth graphical object that indicates the assignment of the first time slot to the first task; and
  controlling the display screen to display the third graphical object and the fourth graphical object.

8. A computing system, comprising:
a processor connected to memory; and
a scheduling module stored on a non-transitory computer readable medium and configured with instructions that when executed by the processor cause the processor to perform operations comprising:
  in response to receiving a request to modify a scheduling data structure that includes a plurality of time slots, determining that the request is directed towards scheduling a first task assigned a first priority within a time frame;
  analyzing a plurality of layers of the scheduling data structure to identify candidate time slots, within the time frame, usable to satisfy the request, comprising:
    analyzing a first layer of the scheduling data structure to identify one or more time slots based upon a determination that the one or more time slots are within the time frame and are assigned to one or more tasks assigned a second priority lower than a threshold priority; and
    analyzing a second layer of the scheduling data structure by analyzing the one or more time slots to identify a first time slot based upon a determination that the first time slot is assigned to a second task for which an alternative time slot is available;
  controlling a display screen to display a first graphical object that corresponds to the first time slot and a second graphical object that corresponds to a second time slot, wherein the first graphical object and the second graphical object are selectable to satisfy the request;

in response to receiving user input, via the first graphical object, that selects the first time slot from the candidate time slots, generating a set of scheduling instructions (i) unassigning the first time slot from the second task, (ii) assigning the alternative time slot to the second task and (iii) assigning the first time slot to the first task; and modifying and regenerating the scheduling data structure, based upon the set of scheduling instructions, to assign the alternative time slot to the second task and the first time slot to the first task.

9. The computing system of claim 8, wherein the scheduling data structure includes a plurality of tasks assigned to one or more of the plurality of time slots, wherein the candidate time slots are identified by analyzing the scheduling data structure to determine the plurality of time slots and determine which of the plurality of time slots are assigned to a task and which are not assigned to a task.

10. The computing system of claim 8, wherein the operations further comprise:
identifying the first time slot and a third time slot of the one or more time slots;
determining that the first time slot is assigned to the second task and the third time slot is assigned to a third task;
in response to determining that the alternative time slot is available for the second task, including the first time slot in the candidate time slots; and
in response to determining that no alternative time slot is available for the third task, excluding the third time slot from the candidate time slots.

11. The computing system of claim 8, wherein the scheduling data structure further comprises:
a first data substructure, associated with a first user, comprising a plurality of time slots and a plurality of tasks assigned to one or more of the plurality of time slots;
a second data substructure, associated with a second user, comprising a plurality of time slots and a plurality of tasks assigned to one or more of the plurality of time slots; and
a third data substructure, associated with a third user, comprising a plurality of time slots and a plurality of tasks assigned to one or more of the plurality of time slots.

12. The computing system of claim 11, wherein the operations further comprise determining that the request is directed towards the first user, wherein the analyzing the scheduling data structure to identify candidate time slots usable to satisfy the request further comprises:
analyzing the first data substructure; and
in response to determining that one or more of the plurality of time slots of the first data substructure are not usable to satisfy the request:
determining that the second user is associated with a same capability as the first user; and
analyzing the second data substructure to identify candidate time slots usable to satisfy the request.

13. The computing system of claim 11, wherein the operations further comprise determining that the request is directed towards the first user, wherein the analyzing the scheduling data structure to identify candidate time slots usable to satisfy the request further comprises:
analyzing the first data substructure; and
in response to determining that one or more of the plurality of time slots of the first data substructure are not usable to satisfy the request:
determining that the third user is not associated with a same capability as the first user; and
not analyzing the third data substructure to identify candidate time slots usable to satisfy the request.

14. The computing system of claim 8, wherein the operations further comprise:
generating a third graphical object that indicates the assignment of the alternative time slot to the second task;
generating a fourth graphical object that indicates the assignment of the first time slot to the first task; and
controlling the display screen to display the third graphical object and the fourth graphical object.

15. A computer-implemented method performed by a computing device comprising a processor, the computer-implemented method comprising:
executing, on the processor, instructions that cause the computing device to perform operations comprising:
in response to receiving a request to modify a scheduling data structure that includes a plurality of time slots, determining that the request is directed towards scheduling a first task assigned a first priority within a time frame;
analyzing, by at least the processor, the scheduling data structure to identify candidate time slots, within the time frame, usable to satisfy the request, comprising:
analyzing the scheduling data structure to identify one or more time slots based upon a determination that the one or more time slots are within the time frame and are assigned to one or more tasks assigned a second priority lower than a threshold priority; and
analyzing the one or more time slots to identify a first time slot based upon a determination that the first time slot is assigned to a second task for which an alternative time slot is available;
controlling a display screen to display a first graphical object that corresponds to the first time slot and a second graphical object that corresponds to a second time slot, wherein the first graphical object and the second graphical object are selectable to satisfy the request;
in response to receiving user input, via the first graphical object, that selects the first time slot from the candidate time slots, generating a set of scheduling instructions (i) unassigning the first time slot from the second task, (ii) assigning the alternative time slot to the second task and (iii) assigning the first time slot to the first task; and
modifying and regenerating the scheduling data structure, based upon the set of scheduling instructions, to assign the alternative time slot to the second task and the first time slot to the first task.

16. The computer-implemented method of claim 15, wherein the scheduling data structure includes a plurality of tasks assigned to one or more of the plurality of time slots, wherein the candidate time slots are identified by analyzing the scheduling data structure to determine the plurality of time slots and determine which of the plurality of time slots are assigned to a task and which are not assigned to a task.

17. The computer-implemented method of claim 15, wherein the method further comprises:
identifying the first time slot and a third time slot of the one or more time slots;
determining that the first time slot is assigned to the second task and the third time slot is assigned to a third task;

in response to determining that the alternative time slot is available for the second task, including the first time slot in the candidate time slots; and in response to determining that no alternative time slot is available for the third task, excluding the third time slot from the candidate time slots.

18. The computer-implemented method of claim 15, wherein the scheduling data structure is generated to comprise:
   a first data substructure, associated with a first user, comprising a plurality of time slots and a plurality of tasks assigned to one or more of the plurality of time slots;
   a second data substructure, associated with a second user, comprising a plurality of time slots and a plurality of tasks assigned to one or more of the plurality of time slots; and
   a third data substructure, associated with a third user, comprising a plurality of time slots and a plurality of tasks assigned to one or more of the plurality of time slots.

19. The computer-implemented method of claim 18, wherein the method further comprises determining that the request is directed towards the first user, wherein the analyzing the scheduling data structure to identify candidate time slots usable to satisfy the request further comprises:
   analyzing the first data substructure; and
   in response to determining that one or more of the plurality of time slots of the first data substructure are not usable to satisfy the request:
      determining that the second user is associated with a same capability as the first user; and
      analyzing the second data substructure to identify candidate time slots usable to satisfy the request.

20. The computer-implemented method of claim 15, wherein the method further comprises:
   generating a third graphical object that indicates the assignment of the alternative time slot to the second task;
   generating a fourth graphical object that indicates the assignment of the first time slot to the first task; and
   controlling the display screen to display the third graphical object and the fourth graphical object.

* * * * *